United States Patent
Flanders et al.

(10) Patent No.: US 8,805,115 B2
(45) Date of Patent: Aug. 12, 2014

(54) CORRECTION OF VARIABLE OFFSETS RELYING UPON SCENE

(71) Applicant: Raytheon Company, Waltham, MA (US)

(72) Inventors: Bradley A. Flanders, Whittier, CA (US); Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 124 days.

(21) Appl. No.: 13/667,263

(22) Filed: Nov. 2, 2012

(65) Prior Publication Data

US 2014/0126836 A1    May 8, 2014

(51) Int. Cl.
 *G06K 9/40* (2006.01)
 *G06K 9/46* (2006.01)
 *G06K 9/66* (2006.01)

(52) U.S. Cl.
 USPC ........................................ 382/275; 382/191

(58) Field of Classification Search
 CPC ................... G06T 2207/10036; G06T 7/0018; G01J 3/28
 USPC .................... 382/191, 275; 356/303
 See application file for complete search history.

(56) References Cited

U.S. PATENT DOCUMENTS

| | | | |
|---|---|---|---|
| 5,631,466 A * | 5/1997 | Botti et al. | 250/332 |
| 6,008,492 A | 12/1999 | Slater et al. | |
| 6,075,891 A | 6/2000 | Burman | |
| 6,208,752 B1 | 3/2001 | Palmadesso et al. | |
| 6,359,681 B1 * | 3/2002 | Housand et al. | 356/4.01 |
| 6,433,333 B1 * | 8/2002 | Howard | 250/252.1 |
| 6,504,943 B1 | 1/2003 | Sweatt et al. | |
| 6,535,632 B1 | 3/2003 | Park et al. | |
| 6,665,438 B1 | 12/2003 | Lin | |
| 6,678,048 B1 | 1/2004 | Rienstra et al. | |

(Continued)

FOREIGN PATENT DOCUMENTS

| | | | |
|---|---|---|---|
| CN | 101763445 | | 6/2010 |
| JP | 2003298949 A | * | 10/2003 |
| WO | 2010056254 A1 | | 5/2010 |
| WO | 2010141114 A2 | | 12/2010 |

OTHER PUBLICATIONS

Wohlberg et al., Symmetrized local co-registration optimization for anomalous change detection, Proc. SPIE 7533 (2010).*

(Continued)

*Primary Examiner* — Yubin Hung
(74) *Attorney, Agent, or Firm* — Burns & Levinson LLP; Joseph M. Maraia

(57) ABSTRACT

In accordance with various aspects of the disclosure, a method, system, and computer readable media having instructions for processing images is disclosed. For example, the method includes determining a suspicious pixel suspected of causing an artifact in a measurement as a function of a statistical analysis of a collection of samples representing residual error values associated with a subject focal plane pixel measuring one waveband at different times. Based on the determination of the suspicious pixel, a pattern of residual error values is identified that is indicative of the artifact caused by the suspicious pixel. A correcting time-dependent offset determined that is substantially reciprocal to the identified pattern of residual error values. The correcting time-dependent offset is applied to the measurement to correct for artifact in the measurement.

13 Claims, 6 Drawing Sheets

(56) References Cited

U.S. PATENT DOCUMENTS

| | | | |
|---|---|---|---|
| 6,701,021 | B1 | 3/2004 | Qian et al. |
| 6,750,964 | B2 | 6/2004 | Levension et al. |
| 6,782,138 | B1 | 8/2004 | Leisner et al. |
| 6,804,400 | B1 | 10/2004 | Sharp |
| 6,859,275 | B2 | 2/2005 | Fateley et al. |
| 6,940,999 | B2 | 9/2005 | Lin |
| 6,952,499 | B1 | 10/2005 | Vititoe |
| 7,180,588 | B2 | 2/2007 | Geshwind et al. |
| 7,194,111 | B1 | 3/2007 | Schaum et al. |
| 7,251,376 | B2 | 7/2007 | Qian et al. |
| 7,356,201 | B2 | 4/2008 | Gunther et al. |
| 7,463,778 | B2 | 12/2008 | Damera-Venkata |
| 7,486,734 | B2 | 2/2009 | Machida |
| 7,505,608 | B2 | 3/2009 | Portigal et al. |
| 7,680,337 | B2 | 3/2010 | Gruninger et al. |
| 7,773,828 | B2 | 8/2010 | Sakata et al. |
| 7,792,321 | B2 | 9/2010 | Palmadesso et al. |
| 8,018,647 | B2 | 9/2011 | Rice et al. |
| 8,150,195 | B2 | 4/2012 | Demirci et al. |
| 8,165,344 | B2 | 4/2012 | Shirasaka |
| 8,175,393 | B2 | 5/2012 | Robinson |
| 8,315,472 | B2 | 11/2012 | Robinson et al. |
| 8,391,961 | B2 | 3/2013 | Levenson et al. |
| 2002/0015151 | A1* | 2/2002 | Gorin ............................ 356/303 |
| 2003/0012398 | A1 | 1/2003 | Sunshine et al. |
| 2004/0218172 | A1 | 11/2004 | DeVerse et al. |
| 2006/0188161 | A1 | 8/2006 | Gruninger et al. |
| 2006/0233421 | A1 | 10/2006 | Portigal et al. |
| 2006/0247514 | A1 | 11/2006 | Panasyuk et al. |
| 2007/0076955 | A1 | 4/2007 | Schaum et al. |
| 2008/0030597 | A1* | 2/2008 | Olsen et al. ................. 348/227.1 |
| 2008/0107346 | A1* | 5/2008 | Zhang et al. .................... 382/215 |
| 2008/0218610 | A1* | 9/2008 | Chapman et al. ............. 348/246 |
| 2008/0302956 | A1* | 12/2008 | Anderson ................... 250/252.1 |
| 2009/0074297 | A1 | 3/2009 | Robinson |
| 2010/0118047 | A1* | 5/2010 | Ajito et al. ..................... 345/589 |
| 2010/0158330 | A1 | 6/2010 | Guissin et al. |
| 2010/0303371 | A1 | 12/2010 | Robinson et al. |
| 2011/0002546 | A1 | 1/2011 | Conger et al. |
| 2012/0224782 | A1 | 9/2012 | Robinson et al. |
| 2012/0239330 | A1* | 9/2012 | Tremblay et al. ............... 702/85 |
| 2012/0314920 | A1 | 12/2012 | Prigent et al. |

OTHER PUBLICATIONS

Carmona et al., Affine Illumination Compensation for Multispectral Images, SCIA 2007, LNCS 4522, (2007), 522-531.*
White et al., From At-Sensor Observation to At-Surface Reflectance—Calibration Steps for Earth Observation Hyperspectral Sensors, IEEE IGARSS (2004), pp. 3241-3244.*
Gao et al., A Comparative Study on Linear Regression-Based Noise Estimation for Hyperspectral Imagery, IEEE J. Selected Topics in Applied Earth Observations and Remote Sensing, vol. 6, No. 2, Apr. 2013, pp. 488-498.*
Shippert, Introduction to Hyperspectral Image Analysis, Earth Science Applications Specialist Research Systems, Inc., Jan. 3, 2003.
Stein et al., "Anomaly detection from hyperspectral imagery," IEEE Signal Processing Magazine, IEEE Service Center, Piscataway NJ, vol. 19, No. 1 pp. 58-69, Jan. 2002.
Robinson, "Comparison of Hyperspectral Sub Pixel Detection with and without prior knowledge of Target Features," 1998 IEEE.
Sun, L., et al., "Improved Iterative Error Analysis for Endmember Extraction from Hyperspectral Imagery", SPIE Imaging Spectrometry XIII, vol. 708, pp. 400-407, Intro., Sec 2.2-pp. 3-5 (Aug. 2008).
Rogge, D.M., et al., "Integration of Spatial-Spectral Information for the Improved Extraction of Endmembers", Remote Sensing of Environment, Elsevier, vol. 110, No. 3, pp. 287-303 (Aug. 2007).
Veganzones, M.A., et al., "Endmember Extraction Methods: A Short Review", pp. 400-407 (Sep. 2008).
Duran, "A time efficient method for anomaly detection in hyperspectral images," IEEE transactions on geoscience and remote sensing, vol. 45, 2007.

Plaza, A., et al., "Spatial/Spectral Endmember Extraction by Multi-dimensional Morphological Operations", IEEE Transactions on Geoscience and Remote Sensing, IEEE Service Ctr., NJ, US, vol. 40, No. 9, pp. 2025-2029 (Sep. 2002).
Plaza, A., et al., "A New Approach to Mixed Pixel Classification of Hyperspectral imagery based on extended Morphological profiles", Pattern Recognition, Elsevier, vol. 37, No. 6, pp. 1097-1116 (Jun. 2004).
Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).
Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).
Keshava, N., et al., "Sprectral Unmixing", IEEE Signal Processing Magazine, vol. 19, No. 1, pp. 44-57, Jan. 1, 2002, XP011093745.
Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet<URL: http://webee.technion.ac.il/uploads/file/publication/684.pdf.
Manolakis et al., "Is There a Best Hyperspectral Detection Algorithm?", SPIE—Newsroom; pp. 1-3 (2209).
Ulug Bayazit, "Region Adaptive Spectral Transformation for Wavelet Based Color Image Compression", Image Processing (CIP), 2009 16th IEEE International Conference on, IEEE, Piscataway, NJ, Nov. 7, 2009, pp. 2817-2820, Section 2 and 3.
Dohyun Ahn et al., "Rate-Distortion Optimized Image Compression Using Generalized Principal Component Analysis", Acoustics, Speech and Signal Processing , 2006. ICASSP 2006 Proceedings, 2006 IEEE International Conference on Toulouse, France 14-19, May 14, 2006, pp. 5-8.
Memarsadeghi, N et al., "A Fast Implementation of the Isodata Clustering Algorithm", IJCGA, vol. 17, No. 1, pp. 71-103 (2007).
Wei, C-P, et al., "Empirical Comparison of Fast Clustering Algorithms for Large Data Sets", Proceedings of the 33rd Hawaii Int'l. Conf. on System Sciences, pp. 1-10 (2000).
Yan, D, et al., "Fast Approximate Spectral Clustering", KDD'09, (9 pages) Jun. 28-Jul. 1, 2009, Paris, France.
Meza et al., "Applied Non-Uniformity Correction Algorithm for Striping Noise Removal in Hyperspectral Images", [Downloaded from the Internet: http://nuc.die.udec.cl/publications/papers/2010-NUCStrippingNoise.pdf on Nov. 20, 2012].
Jiang, Ming-Fei, et al., "A Robust estimation of Virtual Dimensionality in Hyperspectral Imagery," Computational Problem-Solving (ICCP), 2010 International Conference on, vol., No., pp. 374-378, Dec. 3-5, 2010.
Harsanyi, Joseph C., et al., "Hyperspectral Image Classification and Dimensionality Reduction: An Orthogonal Subspace Projection Approach," ZEEE Tmns. on Geoscience and Remote Sensing, 32(4), Jul. 1994.
Neville, R.A., et al., "Automatic Endmember Extraction from Hyperspectral Data for Mineral Exploration", 4th Int. Airborne remote Sensing Conf. Exhibition/21st Canadian Symposium on Remote Sensing, pp. 891-896 1999.
Orthogonality and Least Squares, http://www.aerostudents.com/files/linearAlgebra/orthogonalityLeast Squares.pdf, Jul. 2009.
Marco F. Durarte et al., "Structured Compressed Sensing: From Theory to Applications" IEEE Transactions on Signal Processing, IEEE Service Center, New York, vol. 59, No. 9, Sep. 1, 2011, pages.
Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.
Manolakis et al., "Hyperspectral Image Processing for Automatic Target Detection Applications,", http://www.cis.rit.edu/-cnspci/references/dip/manolakis2003.pdf, 2003.
Leathers et al., "Scene-based Nonuniformity Corrections for Optical and SWIR Pushbroom Sensors", Optics Express; 13(13): 5136-5150 (Jun. 27, 2005).

(56) References Cited

OTHER PUBLICATIONS

Winter, Michael, "Comparison of Approaches for Determining Endmembers in Hyperspectral Data", IEEE 2000.

Winter, Michael, "N-FINDR: An Algorithm for Fast Autonomous Spectral End-member Determination in Hyperspectral Data", SPIE 1999.

Plaza, Antonio, et al., "A Quantitive and Comparative Analysis of Endmemeber Extraction Algorithms From Hyperspectral Data", IEEE 2004.

Boardman, J., et al., Mapping Target Signatures Via Partial Unmixing of Aviris Data, Citeseer 1995.

Caefer, "Analysis of false alarm distribution in the development and evaluation of hyperspectral point target detection algorithms," Optical engineering, 2007.

Foy, et al., "Decision Boundaries in Two Dimensions for Target Detection in Hyperspectral Imagery," Optics Express: 17(20): 17391-17411 (2009).

Funk, et al., "Clustering to improve matched filter detection of weak gas plumes in hyperspectral thermal imagery," IEEE Transactions on Geoscience and Remote Sensing; 39(7):1410-1420 (2001).

Halper, "Global, local and stochastic background modeling for target detection in mixed pixels," The MITRE Corporation, Case#0838; 13 pages, (Jun. 2010).

Kerekes, et al., "Hyperspectral Imaging System Modeling" Lincoln Laboratory journal; 14(1):117-130 (2003).

Manolakis, et al, Detection algorithms for hyperspectral imaging data exploitation,: MIT Lincoln Laboratory ASAP 2002; 9 pages (2002).

Manolakis, "Standoff detection and identification of chemical plumes with long wave hyperspectral imaging sensors," MIT Lincoln Laboratory; RTO-MP-SET; pp. [2-1]-[2-10] 2009.

Messinger et al., "Detection of gaseous effluents from airborne LWIR hyperspectral imagery using physics-based signatures," Institute of Technology, pp. 712-723, (2006).

Ientilucci, et al., "Target detection in a structured background environment using an infeasibility metric in an invariant space; algorithms and technologies for multispectral, hyperspectral and ultraspectral imagery XI;" Proceedings of SPIE, v. 5806, pp. 491-502, 2005.

Jacobsen et al., "Monitoring grasslands using convex geometry and partial unmixing—a case study," 1st EARSel Workshop on Imaging Spectroscopy, pp. 309-316; Oct. 1998.

Kruse et al., "Extraction of compositional information for trafficability mapping from hyperspectral data;" SPIE international symposium on AeroSense, vol. 4049, pp. 262-273; Apr. 2000.

Mundt, et al., Partial unmixing of hyperspectral imagery: Theory and Methods: American Society of Photogrammetry and Remote Sensing Annual Conference, p. 1-12; May 2007.

Nielsen: Spectral mixture analysis: Linear and semiparametric full and iterated partial unmixing in multi- and hyperspectral image data: International Journal of Computer Vision: v. 42, Nos. 1 and 2, pp. 17-37: 2001.

Smith, Introduction to hyperspectral imaging; http://microimages.com; p. 1-24, Jul. 14, 2006.

Gruninger et al., "The sequential maximum angle convex cone (SMACC) endmember model," SPIE Bellingham, WA Apr. 30, 2004.

Xuetao Tao et al., "Orthogonal Bases Approach for the Decomposition of Mixed Pixels in Hyperspectral Imagery," IEEE Geoscience and Remote Sensing Letters, IEEE Service Center, NY, vol. 6, No. 2, Apr. 1, 2009.

Jing Zhang et al., "A Novel Classified Residual DCT for Hyperspectral Images Scalable Compression," (Abstract) 26, Picture Coding symposium, Jul. 11, 2007-Sep. 11, 2007, Lisbon.

\* cited by examiner

CORRECTION OF VARIABLE OFFSETS RELYING UPON SCENE

CROSS REFERENCE TO RELATED APPLICATION

This application is related to U.S. application Ser. No. 13/085,883, filed Apr. 13, 2011, entitled "OPTIMIZED ORTHONORMAL SYSTEM AND METHOD FOR REDUCING DIMENSIONALITY OF HYPERSPECTRAL IMAGES," now issued as U.S. Pat. No. 8,675,989, and to U.S. application Ser. No. 13/446,869, filed Apr. 13, 2012, entitled "SYSTEM AND METHOD FOR POST-DETECTION ARTIFACT REDUCTION AND REMOVAL FROM IMAGES," both are incorporated by reference in their entireties herein.

BACKGROUND

This disclosure relates generally to the field of image processing, and more particularly to a system and a method for residual analysis of images.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These spectra are analyzed to detect targets or spectral anomalies.

Many focal plane arrays (FPAs) used in HSI systems, especially HgCdTe (or MCT), exhibit pixels with random and unexpected changes in offset that vary with time called "blinker pixels" or simply "blinkers." A blinker, a 1/f type of noise, is a time-dependent offset as contrasted with a constant offset. A typical blinker associated with HSI data has an offset value for some period of time over which the data is collected and then another offset value for another period of time. The unpredictable change in offset over time wreaks havoc with calibration of HSI system (and components) and corrupts the HSI data. Blinkers negatively impact the probability ratio that a target is declared when it is present relative to the probability that a target is declared when a target is in fact not present ($P_d/P_{fa}$), and the operability specifications of MCT detectors. Removing blinker pixels results in holes in the measurements for those frames (scenes) and removal is only moderately successful.

MCT FPAs have many advantages for HSI but they also have blinkers, typically 5-30% in long-wave infrared (LWIR) FPAs. Other FPAs, such as short-wave infrared FPAs, also experience blinkers but to a lesser degree than LWIR FPAs. Stringent customer requirements drive HSI systems toward materials with greater cooling requirements or reduced HgCdTe yields, which are expensive. Improved software mitigation of blinkers (and other time-dependent offsets) can improve product and FPA yield/cost. Accordingly, there is a need for on-platform scene based non-uniformity correction of pixels in an inexpensive and computationally fast manner.

SUMMARY

In accordance with an example, a method for processing images includes, in a image processor, given a residual cube derived from a data cube of measurements generated by a focal plane array, in which each sample of the residual cube is a residual error value in approximating the data cube as a linear combination of basis vectors, determining a suspicious pixel suspected of causing an artifact in a measurement as a function of a statistical analysis of a collection of samples representing residual error values associated with a subject focal plane pixel measuring one waveband at different times. The method further includes based on the determination of the suspicious pixel, identifying a pattern of residual error values indicative of the artifact caused by the suspicious pixel. The method further includes determining a correcting time-dependent offset substantially reciprocal to the identified pattern of residual error values. The method further includes applying the correcting time-dependent offset to the measurement to correct for artifact in the measurement.

In accordance with an example, an image processing system includes a memory storing computer executable instructions. The image processing system includes an image processor coupled to the memory. The computer executable instructions when executed by the image processor cause the image processor to determine a suspicious pixel suspected of causing an artifact in a measurement as a function of a statistical analysis of a collection of samples representing residual error values associated with a subject focal plane pixel measuring one waveband at different times, given a residual cube derived from a data cube of measurements generated by a focal plane array, in which each sample of the residual cube is a residual error value in approximating the data cube as a linear combination of basis vectors. The image processor further caused to, based on the determination of the suspicious pixel, identify a pattern of residual error values indicative of the artifact caused by the suspicious pixel. The image processor further caused to determine a correcting time-dependent offset substantially reciprocal to the identified pattern of residual error values. The image processor further caused to apply the correcting time-dependent offset to the measurement to correct for artifact in the measurement.

In accordance with an example, a tangible computer-readable storage medium storing computer readable instructions for processing images, which when executed by one or more processors cause the one or more processors to determine a suspicious pixel suspected of causing an artifact in a measurement as a function of a statistical analysis of a collection of samples representing residual error values associated with a subject focal plane pixel measuring one waveband at different times, given a residual cube derived from a data cube of measurements generated by a focal plane array, in which each sample of the residual cube is a residual error value in approximating the data cube as a linear combination of basis vectors. The one or more processors further caused to, based on the determination of the suspicious pixel, identify a pattern of residual error values indicative of the artifact caused by the suspicious pixel. The one or more processors further caused to determine a correcting time-dependent offset substantially reciprocal to the identified pattern of residual error values. The one or more processors further caused to apply the correcting time-dependent offset to the measurement to correct for artifact in the measurement.

In other examples, any of the aspects above can include one or more of the following features.

In some examples, determining the suspicious pixel includes calculating a statistical parameter value for samples of each focal plane pixel in the residual cube, including the subject focal plane pixel, and identifying the suspicious pixel based on a comparison of the calculated statistical parameter value of the subject focal plane pixel to an average of the calculated statistical parameter values for all focal plane pixels in the residual cube, including the subject focal plane pixel.

In other examples, the calculated statistical parameter value for samples of each focal plane pixel in the residual cube is an average, mean, median, standard deviations or combinations thereof.

In some examples, identifying the pattern includes grouping some of the collection of samples into a first offset group and others into a second offset group, and identifying a transition from a first offset level to a second offset level.

In other examples, identifying the transition includes i) calculating a mean and standard deviation of samples of the first offset group, the first offset group having n number of samples, ii) for each of m number of samples after the nth sample, determining a number of standard deviations from the calculated mean, and iii) establishing the transition based on the determination.

In some examples, establishing the transition includes establishing the transition at the n+1th sample when the number of standard deviations for a sufficient number of the m number of samples exceeds a threshold.

In other examples, establishing the transition includes increasing the number of samples of the first offset group when the number of standard deviations for a sufficient number of the m samples does not exceed a threshold, and re-calculating a mean and standard deviation of the increased number of samples of the first offset group.

In some examples, m number of samples is user defined.

In other examples, m number of samples varies based on a characteristic of the focal plane array.

In some examples, m number of samples is 5 and the sufficient number of the m number of samples is 4.

In other examples, determining the correcting time-dependent offset includes calculating the first offset level as an average or mean of samples of the first offset group and calculating the second offset level as an average or mean of samples of the second offset group, and applying the correcting time-dependent offset includes subtracting the first offset level from measurements associated with the residual error values of the first offset group and subtracting the second offset level from measurements associated with the residual error values of the second offset group.

Accordingly, some examples of the techniques and devices, or "technology," described herein provided for an "in-scene" technique for removing scene structure using derived basis vectors and revealing blinker pixels. Other examples of the technology, characterize blinker pixels, correct a change of offset due to the blinkers, and/or correct pixels that blink one or more times. The technology can provide one or more of the following advantages. Advantageously, some examples of the technology enables improved target detection with cheaper focal plane arrays and fewer false alarms. This improved detection provides better utility to customers, by improving efficiency and allowing more targets to be addressed with fewer resources. The technology also enables use of focal planes of lower quality, with more blinkers, than could otherwise be used; lowering the cost of the system. Some examples of the technology increase operability specifications on a focal plane arrays (in some cases, by twenty times) and/or improve $P_d$ providing fewer missed detection (in some cases, two to ten times fewer) and/or improve $P_{fa}$ providing fewer false alarms (in some cases, thirty times fewer).

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
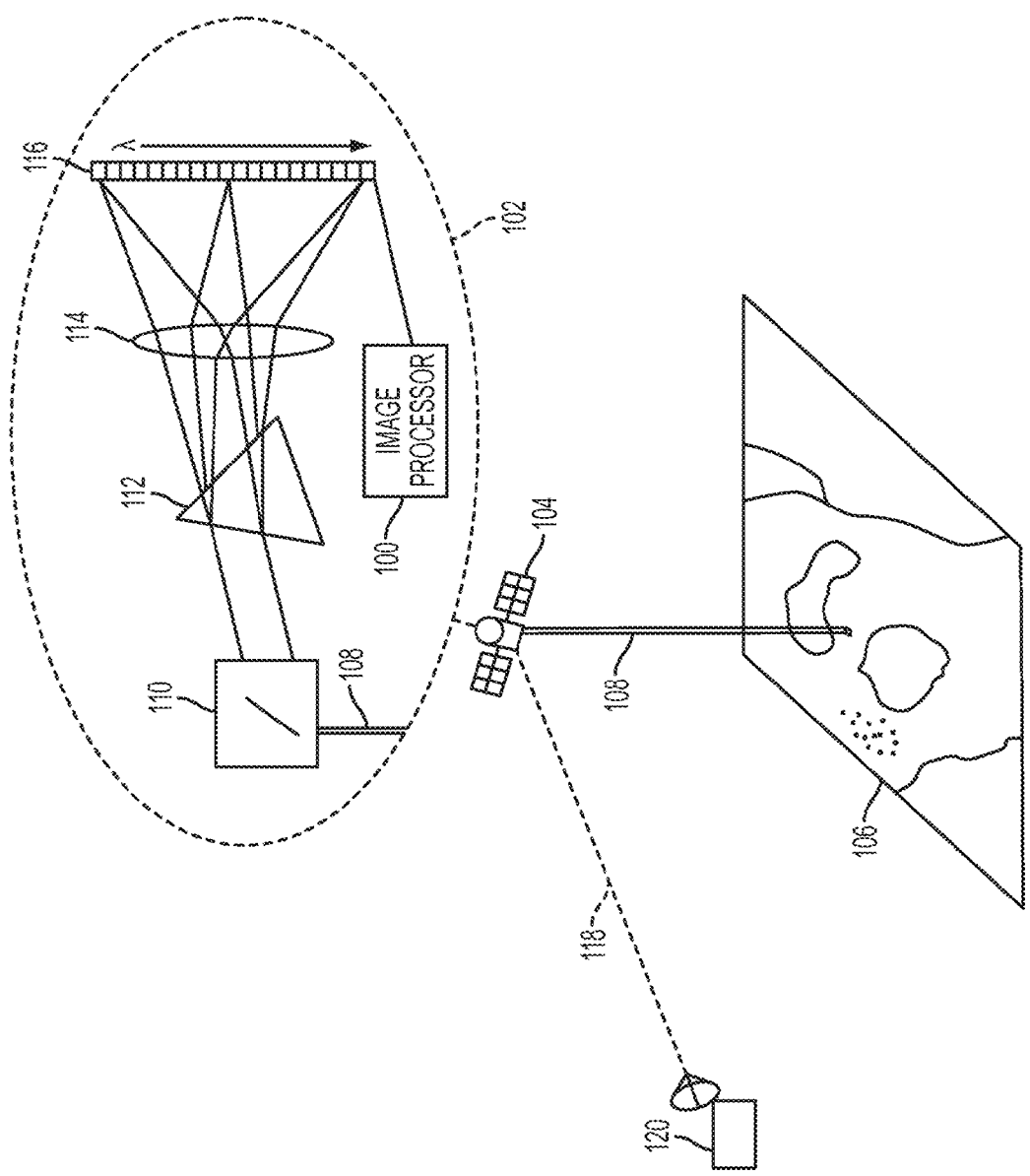
FIG. 1 illustrates an example system for processing images.

In the description that follows, like components have been given the same reference numerals, regardless of whether they are shown in different examples. To illustrate an example (s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Depicted in FIG. 1 is an example of imaging system 102 that is configured to process images. By way of example only, imaging system 102 may be a hyperspectral imaging system. The term "hyperspectral" refers to imaging narrow spectral bands over a continuous spectral range, and producing the spectra of all pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scenes to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106. By way of example only, such a data set formed across the spectrum of wavelengths may be used to construct a hyperspectral image data cube (or, an HSI data cube), such as that described in the above-referenced U.S. application Ser. No. 13/446,869, incorporated by reference in its entirety herein. For example, the HSI data cube may be scanned and input to image processor 100. In an example, the HSI datacube is a three dimensional (3D) data cube with two spatial dimensions corresponding to the spatial dimensions of scene 106, and a third spectral dimension corresponding to the spectra of wavelengths measured for each spatial location. The focal plane, which includes the line of detectors shown in 116, is composed of focal plane pixels, which specify a location in one cross-scan spatial dimension and one spectral band. For example, scanning of two-dimensional scene 106 over a spectrum of wavelengths by imaging system 102 creates an additional spatial dimension, resulting in the 3D HSI data cube. Any two of the three dimensions of the HSI data cube may be selected by image processor 100 to form a two dimensional image input to image processor 100 for processing, in accordance with various examples described herein. For example, spatial pixels may be defined as a spatial location in two-dimensional Cartesian coordinates. As a result, the 3-D HSI data cube comprises a spectrum for each spatial pixel and may be analyzed by image processor 100 as a set of spectra for the spatial pixels. Alternatively, the 3D HSI cube comprises a set of samples at different times along the scan direction for each focal plane pixel and may be analyzed by image processor 100 as a set of samples along the scan direction for each cross-scan spatial location and spectral waveband. As described herein, the term "sample" refers to a focal plane pixel, at a particular reflective wavelength ($\lambda$) and cross-scan location, at a specific time in the scan. Likewise, the term "samples" refers to the focal plane pixel at the particular reflective wavelength and cross-scan location at a set of different time instances, respectively.

Following the generation of the data set in the 3-D HSI data cube corresponding to the hyperspectral image of scene 106, image processor 100 may process the data set so as to reduce the dimensionality of the hyperspectral input scene image and/or decompose the input scene image into a compressed scene image and a hyperspectral residual image, as described in greater detail below. Using alternative terminology, the 3-D data cube may be decomposed into a compressed scene data cube and a residual scene data cube. Such decomposition may be performed by image processor 100, for example, by approximating the spectra of each spatial pixel in the 3-D HSI data cube, as a linear combination of basis vectors (BVs) having coefficients to best approximate the 3D HSI data cube and storing the errors in this approximation in the residual data cube. Such decomposition of the input scene spectra into BVs by the image processor 100 is described, for example, in the above-referenced U.S. application Ser. No. 13/085,883, incorporated by reference in its entirety herein. When the complete set of input scene spectra is considered, image processor 100 may decompose the input HSI data cube using BV coefficients for the spectra of each spatial pixel in the data cube. The term reduced dimensionality is used herein because the number of BV coefficients is smaller than the number of wavebands in the original datacube.

In one example, the compressed scene image (or, compressed image) is a reduced dimensionality scene representation of the input hyperspectral scene image derived from input 3D HSI data cube, and obtained at detector array 116. In an example, as described in greater detail below, the degree to which the dimensionality of the image is reduced in the compressed image and/or whether the dimensionality reduction is to be classified as lossy or lossless may be determined by adjustable features of imaging system 102. The hyperspectral residual image or data cube is comprised of the errors in each spectral waveband for each spatial pixel from the decomposition of the input hyperspectral scene image, and is substantially devoid of any content associated with scene 106, although in some examples, under less than ideal conditions, such as an inadequate BV set, some scene structure may leak into the residual image or the residual scene data cube. Artifacts, such as sensor artifacts or detector array 116 artifacts, manifest as stripes in residual image, as illustrated in various figures below. As such, after the decomposition of the input scene image (or input scene HSI data cube), in various examples, the residual image (or residual scene HSI data cube) may be processed to characterize sensor artifacts in the HSI data cube, detect scene structure leakage into the hyperspectral residual image from scene 106, or perform other analytics on the hyperspectral residual image.

In some examples, imaging system 102 may contain or otherwise provide a front end interface for one or more local processors (e.g., image processor 100) associated with remote imaging system 104. In some such examples, the one or more processors may be configured to analyze the residual image to estimate the non-uniformity correction of focal plane pixels in the hyperspectral image, and subsequently, apply the non-uniformity correction to focal plane pixels in the original hyperspectral image. Non-uniformity in pixels of the input scene image results from unequal response of each pixel to the same light 108. Further, such a response of each pixel may drift over time so the latest calibration of each pixel may be in error. In some examples, imaging system 102 may alternatively or additionally be configured to compress and locally store the hyperspectral image in a memory device (not shown), such that the reduced data set can be communicated rapidly within transmission 118 to remote station 120, which may be a ground station or other remote location where the data set can be further processed. For example, remote station 120 or other processing locations may analyze and process the decomposed image data set for the hyperspectral image without further decomposition, after decompressing the reduced data set to produce the original data set, or any appropriate combination(s) thereof.

As a brief overview, the image processor 100 detects blinkers by projecting out scene structure from a given measured data, and by characterizing the remaining information to separate out changes in pixel offset, including blinking pixel changes. A blinking pixel is a time-dependent offset (contrasted with a constant offset). The blinking pixel has, approximately, an offset value (level) for some part of a time span in which the data is measured and then changes to another offset value (level) for some other part of the time span. The image processor 100 analyzes projection residuals to determine the magnitude of a change in offset of each pixel.

The image processor 100 determines a point(s) during the collection of the measured data when the blinking pixel (s) occurs.

The image processor 100 corrects the measured data with the determined magnitude and determined point. Examples of the image processor 100 correct rather than replace the data. A convenient example of the image processor 100 corrects blinkers that change state either once or twice during a collection of data.

Examples of the image processor 100 add logic to characterize a single pixel having one or more changes of offset level (nominally while having constant gain). Examples of the image processor 100 include logic for spatial spectral comparisons when analyzing band/column samples. Any change in material, causing residuals in one band, leaves residuals in other spectral bands. Typically, a blinker has residuals only in one band. Similarly, any unusual material typically affects nearby spatial pixels in a large sensor point spread function (PSF) system. In some examples, PSF methods for detecting a blinker may provide confirmation of blinker detection. The image processor 100, having stripped out most of the scene information via vector projection, can readily detect the occurrence of blinking and measure the change in offset. Some examples of the image processor 100, "remove" the change from the data set. There are many pixels that change/blink infrequently and some that change frequently. A convenient example of the image processor 100 is tuned to detect either frequent and infrequent blinkers, or both.

Figure 2:
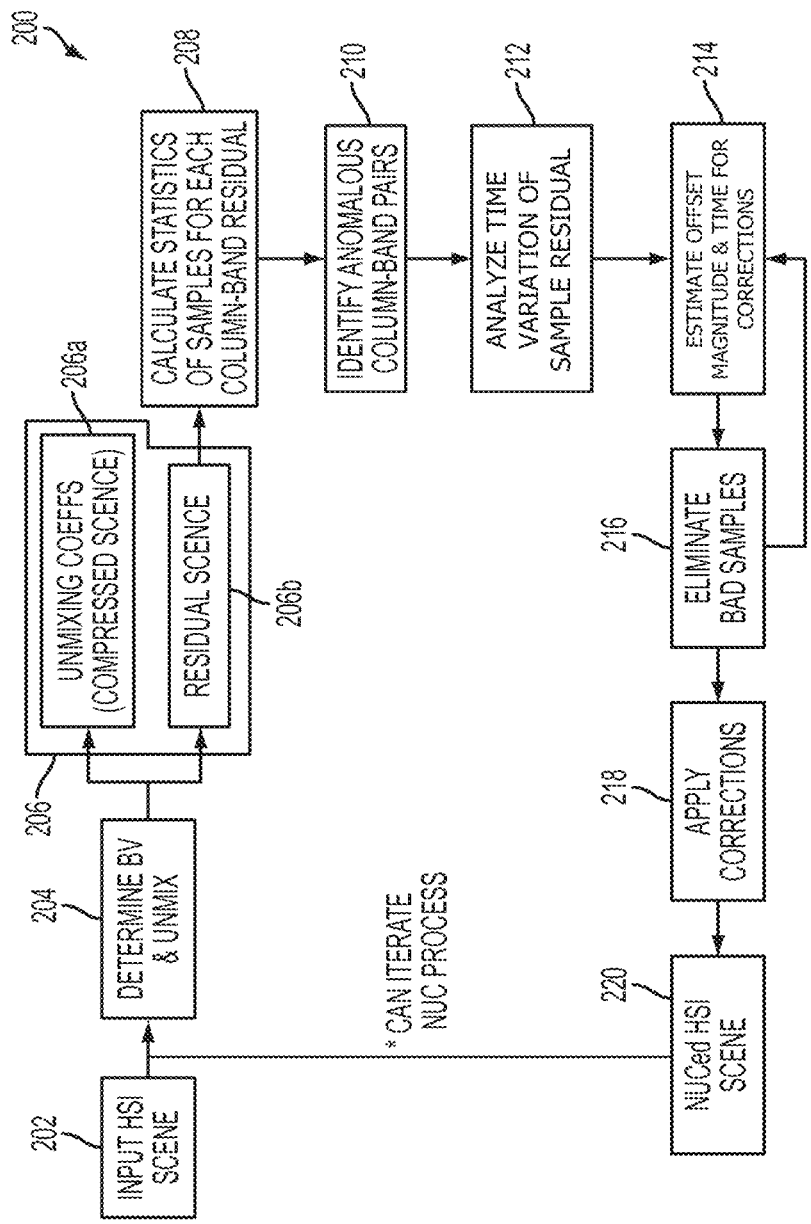
FIG. 2 illustrates an example flowchart of a method for processing images.

FIG. 2 illustrates flow diagram for a method or process 200 for residual analysis of images for non-uniformity correction, in accordance with an example. In one example, the residual HSI image is extracted from an input HSI data cube. Accordingly, although the operations below are being described with respect to one or more residual or compressed images, the operations may be carried out on complete or whole data cubes having a plurality of such images. That is, instead of the terms "image," "images", "composite image," "composite images," "residual image," or "residual images," the terms "data cube," "data cubes," "composite data cube," "composite data cubes," "residual data cube," or "residual data cubes," respectively, may equally be used without departing from the scope of the examples described herein. Further, an image or images may be formed from extracting data of any two of the three dimensions that make up the data cube. For example, image processor 100 may carry out operations on the whole data cube, and as such, the hyperspectral image is actually a 3D image. It can be thought of as spectra for each 2D location or as many 2D scene images in different spectral bands. Some of the processing is done on the whole cube; some is done on images produced from the 3D HSI data cube. Processing done on the whole 3D HSI data cube may be in one dimension (ID) and may be applied to all samples in the other two dimensions, for example, for spectral processing of all the 2D spatial pixels or sample processing of all the 2D focal plane pixels. Image processing may be done on derivatives of the 3D HSI data cube such as the 2D image of the mean residual for each focal plane processing pixel, for example, to identify spots in the image.

In an operation 202, image processor 100 receives one or more hyperspectral images (or, input data cubes) corresponding to an input HSI scene (obtained from scene 106 or a factory supplied image or data cube). In one example, the input HSI scene may have a plurality of images or image frames obtained across various different wavelength bands ($\lambda$) at the focal plane of detector array 116. Alternatively, as also noted above, the whole 3-D HSI data cube may be received at image processor 100 for processing. The input scene image or the input HSI data cube associated with the input scene image may then be provided to image processor 100 for processing. Input scene image may include a plurality of pixels arranged according to a coordinate system (e.g., X-Y Cartesian coordinate system). By way of example only, such pixels may be focal plane pixels and/or spatial pixels, as defined above.

In an operation 204, basis vectors (BVs) associated with each spatial pixel in the input scene image are determined by image processor 100. Each BV used to describe the input scene image represents a spectrum, the intensity at each wavelength, which is a component of each spatial pixel's spectrum. Image processor 100 determines coefficients associated with the BVs for each of the spatial pixels and unmixes the BV representation of the input scene image. The input HSI scene image can be approximately represented as a linear sum of coefficient weighted basis vectors; and the residual components are the error at each waveband for each spatial pixel in this approximation. In one example, a small number of BVs may be used to characterize most of the input scene image. Such a process of determining BVs may include starting with a seed BV and establishing additional BVs to complete a set of BVs that represent the input scene image. The additional BVs may be used to remove scene structure from the residual datacube and residual images derived therefrom, thereby enabling use of additional residual samples for identification and correction of anomalous focal plane pixels. Scene structure may be defined as material in scene 106 with a spectrum that is different from the spectra of other things or items in scene 106. Unmixing of the BVs comprises carrying out a linear fit of vectors to approximate the input scene image. Details of determining BVs and unmixing them are provided in the above-referenced U.S. application Ser. No. 13/085,883, incorporated by reference herein, and will not be described, although other techniques of BV representation of images may be applied by image processor 100 to approximate input scene image leaving artifacts and noise in the residual scene.

In an operation 206, unmixing BVs from every pixel, yields the compressed scene image 206a having unmixed BV coefficients, and residual image 206b. When complete data cubes are processed by image processor 100, a residual HSI data cube (or, residual scene data cube) may be obtained by projecting out one or more basis vectors from every spatial pixel in the input HSI data cube. Ideally, residual image 206b or the residual data cube has no scene structure, because the scene structure is contained in the reduced dimensionality scene image 206a. The error spectra of unmixed BVs form residual image 206b, which may contain sensor artifacts with very little scene content. As the common elements of scene 106, and therefore, input scene image at detector array 116, are extracted into compressed scene image 206a, various artifacts (e.g., sensor artifacts) are exposed as stripes in residual image 206b. The process of unmixing the input scene image or input HSI data cube into compressed scene image 206a (or, compressed scene data cube) and residual image 206b (or, residual scene data cube) is referred to herein by terms "decomposition," "decomposing," "transformation," or "transforming" of input scene image or input HSI data cube. The flow then proceeds to operations 206-216 that are performed upon residual image 206b by image processor 100.

In operation 208, image processor 100 determines statistical characteristics of all samples of the residual for each focal plane pixel in residual image 206b. For example, image processor 100 may calculate such statistical characteristics by calculating one or more statistical parameter values such as an average, a mean, a median, a standard deviation, or combinations thereof (e.g., mean minus a threshold value, etc.), of the samples for each focal plane pixel in residual image 206b or residual HSI data cube from which residual image 206b is derived. Each focal plane pixel in residual image 206b may be uniquely denoted by or identified as a column-band pair. The column corresponds to the focal plane pixel's cross-scan spatial location and the band corresponds to the focal plane pixel's spectral wavelength. The samples of focal plane pixels are generated at each time as the sensor is scanned across scene 106. In one example, average residual spectra for only a column of pixels may be determined, which would be the mean or median value of the error samples at each wavelength for the specified column. A numerical value of the average residual spectra may be stored in a memory device (not shown) coupled to or included in image processor 100.

In operation 210, image processor 100 identifies anomalous column-band pairs corresponding to anomalous focal plane pixels based upon the statistical characterization of the residual error samples of each focal plane pixel (calculated in operation 208) when compared with the residual error statistics of the other or remaining focal plane pixels. For example, image processor 100 determines how far a mean residual error value of a particular pixel is from the computed average value of the mean residual error for all pixels. If the residual error value for that pixel is within a predetermined distance of the average residual error value, then image processor 100 skips that pixel (or, does not modify that pixel). If not, image processor 100 marks that pixel as an anomalous pixel and stores the corresponding column-band pair value in a memory device (not shown) coupled to image processor 100. Therefore, by virtue of the unique column-band pair value, anomalous pixels are identified. In yet another example, anomalous focal plane pixels are identified by image processor 100 based on an unusually large standard deviation of the residual error samples comprising the standard deviation residual image or using both mean residual image and standard deviation residual image. In one example, a combination of thresholding techniques may be used. The anomalous pixels are suspected of causing an artifact in a measurement. For ease of reference, such pixels are referred to as "suspicious pixels".

For at least some of the identified suspicious pixels, the image processor 100 performs additional analysis of a time variation of associated residual error samples to categorize the suspicious pixels. In particular, the image processor 100 identifies a "blinker pixel" or simply "blinker" by finding a pattern of residual error values that has an approximately constant offset for part of a time span being evaluated and then a relatively sharp transition to a different offset, which then remains constant for another part of the time span being evaluated.

Figure 3A:
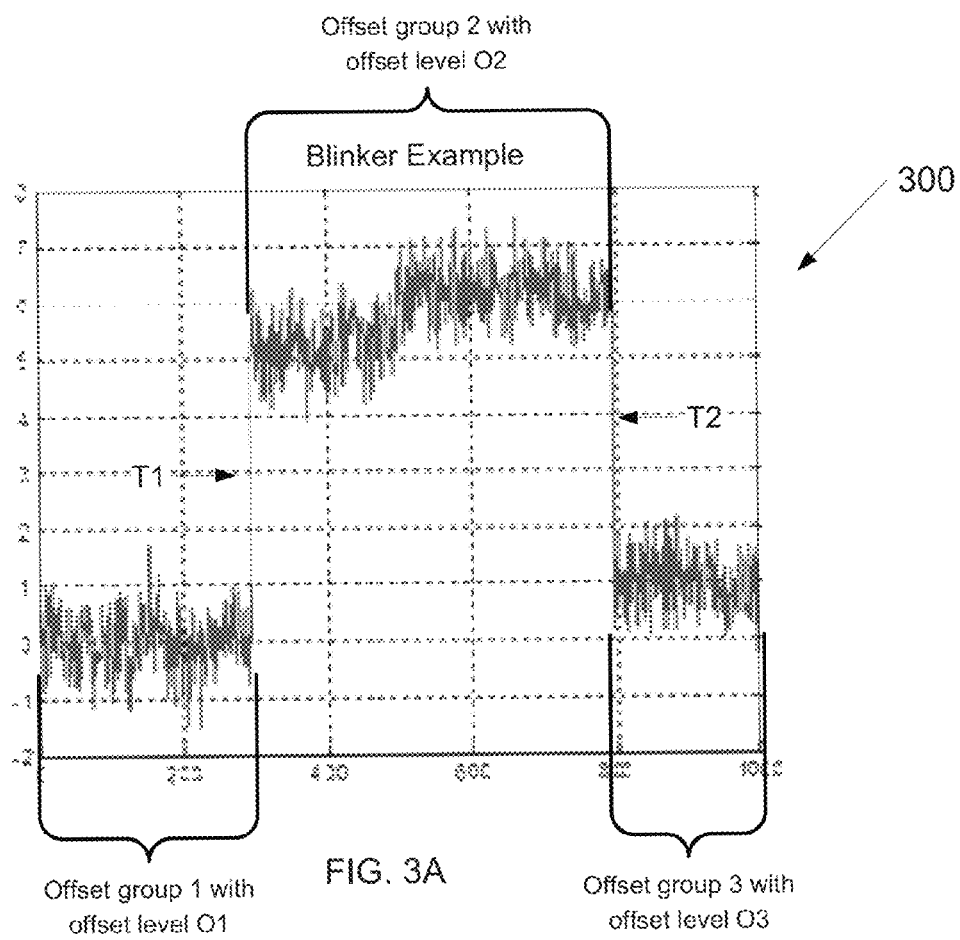
FIGS. 3A and 3B illustrate plots of an example blinker residual after unmixing and the original blinker data.
Figure 3B:
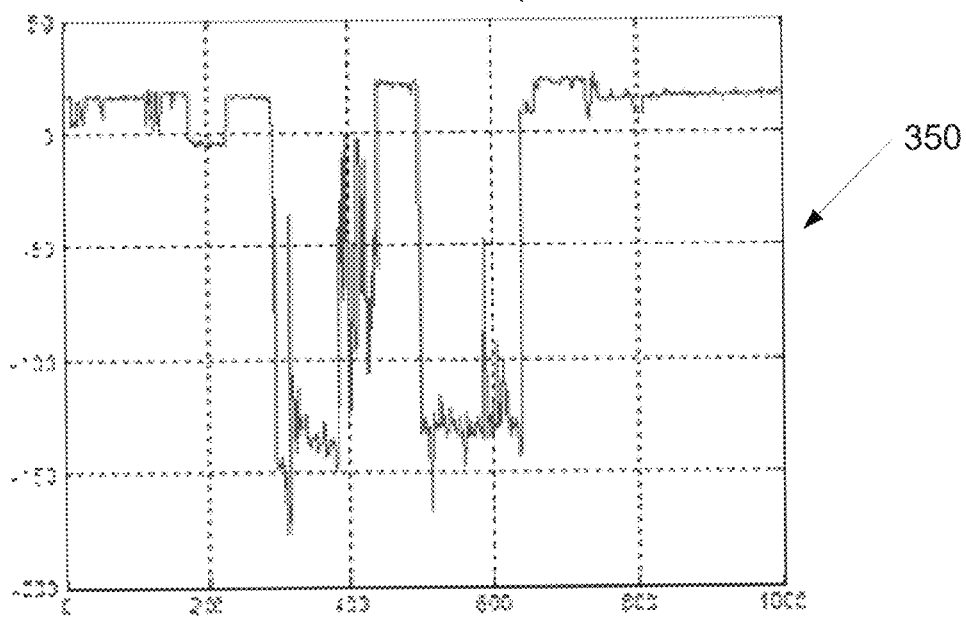

FIGS. 3A and 3B show an example blinker. FIG. 3A shows residual error values 300, after the unmixing operation 206, in which the characteristic pattern of a time-varying or time-dependent offset of a blinker is clear. FIG. 3A shows scan indices associated with the residual error values 300 along the X-axis and intensities of the residual error values 300 along the Y-axis. The scan indices correspond to different times or points in the scan or collection of data in the scan direction of a suspicious pixel. Therefore, each scan index also corresponds to a different in-scan spatial location of a scanned scene (e.g., the scene 106 of FIG. 1). Scan index and time are used interchangeably herein (e.g., scan index 100 and time 100 are the same).

For comparison, the original hyperspectral data 350 corresponding to the suspicious pixel is shown in FIG. 3B to illustrate the exemplary advantages of decomposing the HSI cube into the compressed cube and the residual error cube to separate the scene content from the sensor artifacts as a result of the unmixing operation 206. The example hyperspectral data 350 shown in FIG. 3B is dominated by very large variations corresponding to changes in the material of the scene along the scan direction and variations in the spectra of the different materials. These variations overwhelm the small variations due to the blinkers, making it difficult to identify blinkers accurately and quickly. Note that the scale of FIG. 3B is an order of magnitude larger that FIG. 3A, nevertheless, the blinker shown in FIG. 3A typically causes a 5% error in the data in FIG. 3B.

In operation 212, image processor 100 identifies a pattern of residual error values indicative of an artifact caused by the suspicious pixel. A convenient example of the image processor 100 groups residual error values into different offset groups and identifies transitions among the different offset levels. For example, with reference to FIG. 3A, the image processor 100 groups residual error values from scan index (time) 0 to scan index (time) 299 into a first offset group with first offset level O1, residual error values from scan index (time) 300 to scan index (time) 799 into a second group with a second offset level O2, and residual error values from scan index (time) 800 to scan index (time) 1000 into a third group with a third offset level O3. The image processor determines a time-dependent offset, with 3 offset levels, O1, O2, and O3, that are approximately constant over a span of time. The image processor 100 identifies a transition t1 from the first offset level O1 to the second offset level O2, and another transition t2 from the second offset level O2 to the third offset level O3.

Another convenient example of the image processor 100 calculates a mean and standard deviation of the residual error values of the first offset group having n number of samples. For each of m number of samples after the nth sample, the image processor 100 determines a number of standard deviations from the calculated mean and establishes a transition based on the determination. For example, again with reference to FIG. 3A, the image processor 100 calculates a mean and standard deviation of the first offset level O1, which includes 300 samples (n=300). The image processor 100 determines how many standard deviations away a residual error value at scan index 301 (n+1th sample) is away from the mean of the first offset level O1.

When the residual error value at scan index 301 is "near" (e.g., 1 to 3 standard deviations away) the mean of the first offset level O1, the image processor 100 determines that the residual error value at scan index 301 may be a member of the first offset level O1. The image processor 100 may then determine that at scan index 301 there is no transition from the first offset level O1 to the second offset level O2. Conversely, when the residual error value at scan index 301 is "far" (e.g., more than 3 standard deviations away) from the mean of the first offset level O1, image processor 100 determines that the residual error value at scan index 301 may not be a member of the first offset level O1 but instead may be a member of the second offset level O2. The image processor 100 may then determine that there is transition from the first offset level O1 to a second offset level O2. Because of the possibility of noise affecting the residual error values, a convenient example of the image processor 100 repeats the foregoing determination for m number of residual error values (e.g., 5) after the "last" sample of the first offset level O1 (i.e., n+1, n+2 . . . n+mth sample) before the image processor 100 establishes the transition t1.

Yet another convenient example of the image processor 100 establishes the transition at the n+1th sample when the number of standard deviations for a sufficient number of the m samples after the nth sample exceeds a threshold. Continuing with the example shown in FIG. 3A, m is 5 and residual error values from scan index 300 to 304 are subject to comparisons to a threshold. In some examples, the sufficient number is equal to m (5 in this example). In other examples, the sufficient number is a number less than m (e.g. 4 out of 5). In such examples, the samples exceeding the threshold are or are not required to occur in consecutive order. Each comparison in which a subject sample exceeds the threshold counts towards satisfying the condition of a sufficient number of m samples exceeding a threshold. If the condition is satisfied, the image processor 100 establishes the threshold at scan index 300 (n+1th sample).

Some examples of the image processor 100 increase the number of samples of one or more offset groups when the number of standard deviations for a sufficient number of m samples does not exceed a threshold. These examples of the image processor 100 then re-calculate a mean and standard deviation of the increased number of samples of the one or more offset groups. The image processor 100 continues to identify a pattern of residual error values with the increased number of samples. The foregoing forms the basis for an expanding time window approach.

In the expanding time window approach, the image processor 100 calculates the mean and standard deviation of samples within an expanding time window, beginning at time 0 for example, to identify a spike in residual error values larger than a specified threshold. Exceeding the threshold identifies the transitions, and then resets the expanding window to a next sample. In another approach, the image processor 100 calculates means and averages over shortening time spans of data and identifies transitions in the data. Successive adjustments of the time spans identify transitions and the offset value between the transitions.

In some examples of the image processor 100, the number m, sufficient number, and/or threshold are parameters set by a user of the image processor 100. The user or analyst may set one or more of the foregoing parameters using the front end interface described with reference to FIG. 1. In other examples, these parameters are dynamically set, for example, in response to a characteristic of the focal plane array.

Figure 4:
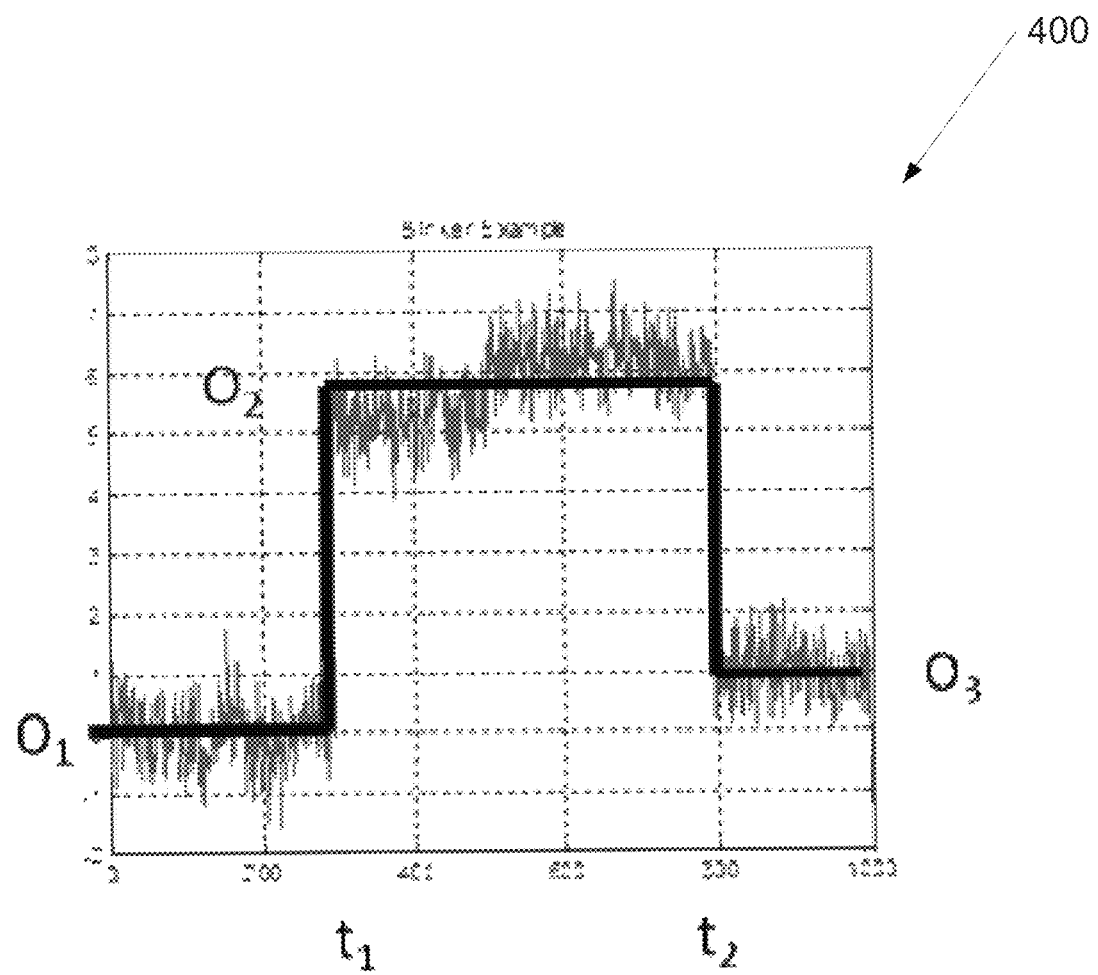
FIG. 4 illustrates a plot for determining a correcting time-dependent offset, in accordance with an example.

In operation 214, the image processor 100 determines a correcting time-dependent offset (correction) substantially reciprocal to the identified pattern of residual error values. FIG. 4 shows a pattern 400 identified by the image processor 100. The identified pattern 400 includes from time 0 through a first transition t1, a first offset group with an offset level O1; from the first transition t1 through a second transition t2, second offset group with an offset level O2; and from the second transition t2 through time 1000, third offset group with an offset level O3. Some examples of the image processor 100 fit the residual data with a square wave pattern and estimate the transitions, ti, and offsets, Oi. A convenient example of the image processor 100 calculates the offset levels O1, O2, and O3, as a mean or average of at least some of the samples grouped in the first, second, and third offset groups, respectively.

In operation 216, image processor 100 eliminates the outlier samples. In some examples, the processor may determine that some small number of samples within each offset group have a large offset compared to the rest of the samples within the group. These samples may be deleted in estimating the offset levels, O1, O2, and O3.

In operation 218, image processor 100 applies a correcting time-dependent offset (correction) to a measurement (original data) to correct for an artifact in the measurement (corrected data). A convenient example of the image processor 100 subtracts an offset level from measurements associated with residual error values of an offset group. For example, with reference to FIG. 4, for the time 0 through t1, corrected data=original data−O1; for time t1 through t2, corrected data=original data−O2; and from t2 through t1000, corrected data=original data−O3.

In operation 220, a reconstructed non-uniformity corrected HSI input scene image (or, input scene HSI data cube) is created by image processor 100 based upon the results of operations 210-218. The acronym "NUCed" stands for "non-uniformity corrected." Such a reconstructed input scene image (or, input scene HSI data cube) may be used for target detection by remote station 120 or by imaging system 102. The reconstructed scene image may itself be used by image processor 100 to carry out operations 204-218 again in a recursive manner to further refine the determination and correction of time-dependent offset (blinker) errors (and hence, the corresponding time-dependent offset correction values).

Figure 5:
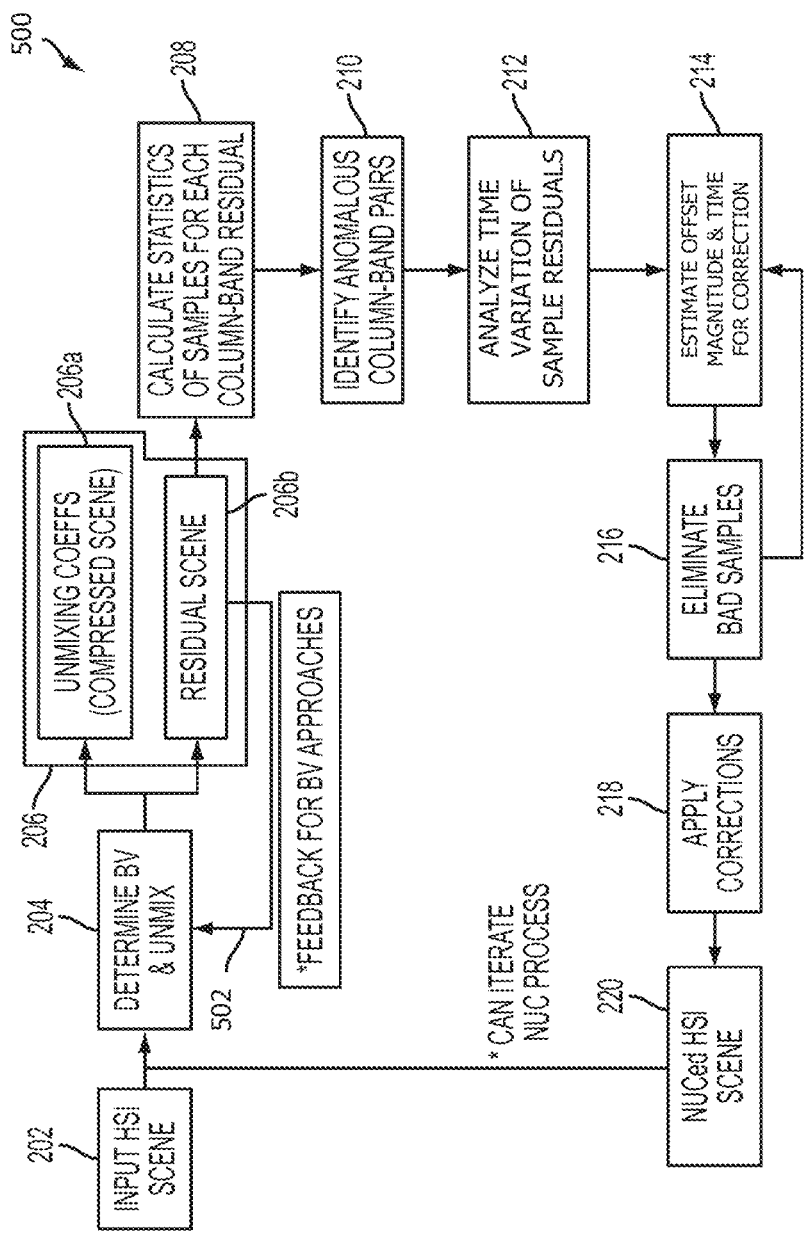
FIG. 5 illustrates an example flowchart of a method for processing images.

FIG. 5 illustrates an example where the flow diagram of method or process 200 is modified into a flow diagram of method or process 500. Operations in method 500 are similar to operations 202-220 of method 200 except that operation 204 of determining and unmixing BVs may be applied to residual image 206b itself, in addition to applying operation 204 to the input HSI scene image only. By way of example only, such feedback of pixels of residual image 206b, shown by path or feedback loop 502, causes further refinement of residual image 206b prior to application of operations 208-220 on residual image 206b. An advantage of applying operation 204 to residual image 206b iteratively is that residual image 206b has a lesser amount of input HSI scene leakage, relative to when there is no feedback or iterative unmixing of BVs to residual image 206b or residual scene data cube. An example advantage of such feedback loop 502 is to provide an improved non-uniformity correction rather than to controlling the basis vectors solely based on the adequacy of the compressed data.

Figure 6:
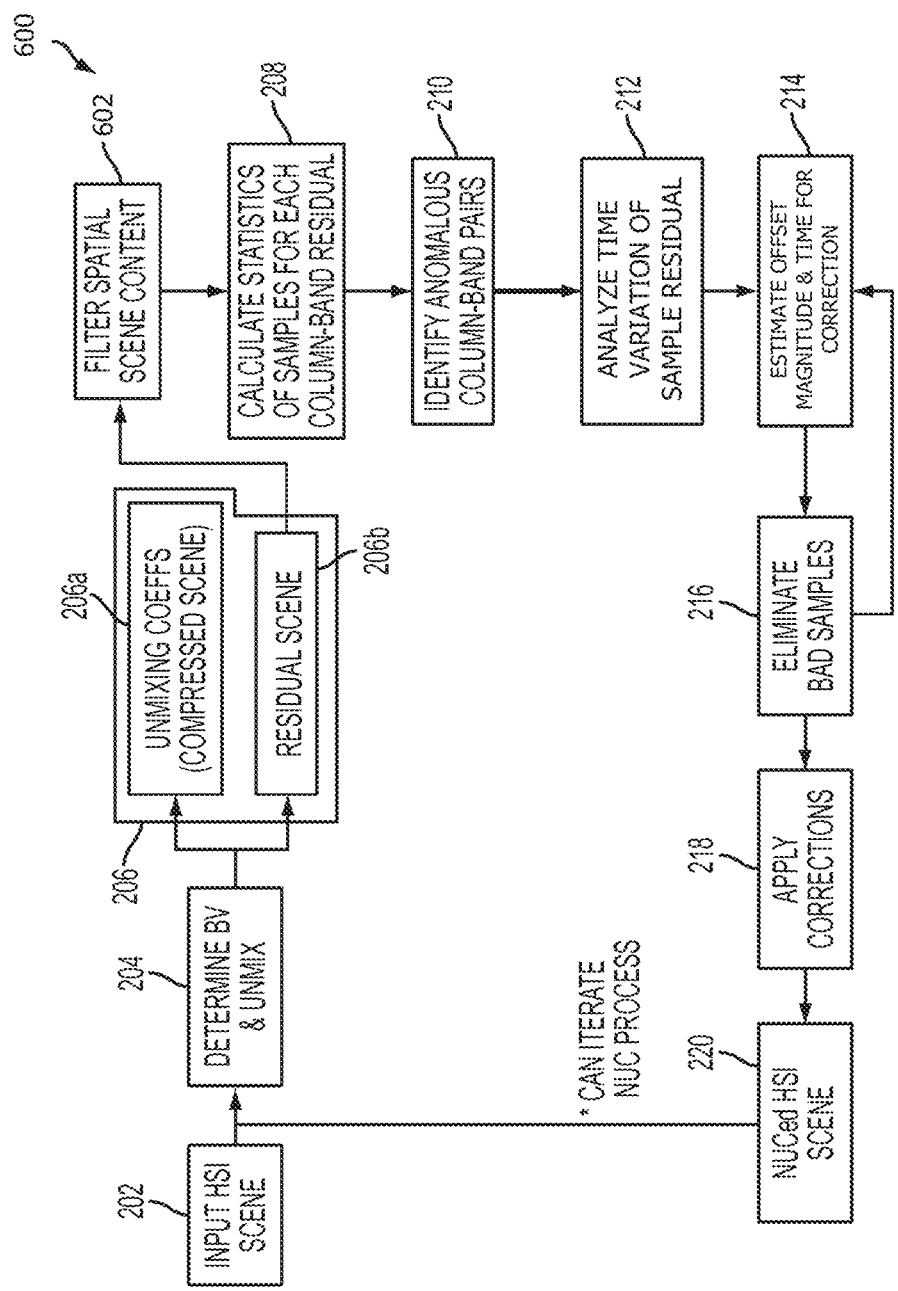
FIG. 6 illustrates an example flowchart of a method for processing images.

FIG. 6 illustrates an example where the flow diagram or method or process 200 is modified to a flow diagram of method or process 600. In method 600, operation 602 is added to operations 202-220 of method 200. The additional operation identifies scene content that has leaked into the residual cube, but rather than remove it by unmixing additional basis vectors, as in FIG. 6, the scene content is filtered from the samples used in calculating the focal plane pixel statistics in operation 208. The scene content leakage consists of spatial patterns in the residual cube due to a non-ideal decomposition of the original data into a compressed scene and residual cube.

In operation 602, residual image 206b from operation 206 is filtered by one or more filters (not shown) implemented or configured by image processor 100 for spatial scene content or scene structure present in residual image 206b. Identification of such leakage of scene content or structure into residual image 206b (or, residual HSI data cube) comprises identifying one or more spatial pixels whose residual spectrum contains scene structure, not just noise and sensor artifacts. These spectra result in one or more samples with scene contamination in the corresponding focal plane pixels. In one example, the spatial samples of the residual datacube identified as containing scene structure are eliminated from the residual HSI datacube prior to the determining the average, mean, median, standard deviation, or other statistical parameter value of the spatial samples of residual values for the focal plane pixels, in operation 208, and/or prior to the comparing the samples of the residual for the identified anomalous focal plane pixels with the values of corresponding focal plane pixels in the input data cube, in operation 212. In other examples, these poor samples are not eliminated from the residual image 206b or residual HSI datacube, but they are flagged to be ignored in determining the mean, median, or standard deviation of the spatial samples of residual values for the focal plane pixels in operation 208. Filtering may be carried out by image processor 100 using digital filters implemented in hardware, using filtering programs or code residing in a memory of image processor 100, or combinations thereof.

In one example, the operations 202-220, 502, and 602 and other combination of processes described in operations in flow diagrams for methods 200, 500, and 600, respectively above, may be iterated or repeated more than once to obtain a higher quality of residual images and detection and elimination of anomalous pixels.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Image processor 100 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., image processor 100) cause the one or more processors to carry out or implement the features and functionalities of various examples discussed herein.

Data transmission including transmission 118 of residual image 206b and/or residual scene data cube and reconstructed residual and input scene images (or, reconstructed 3-D HSI data cube) and instructions may occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

What is claimed is:

1. A method for correcting an artifact in a measurement caused by a pixel in a focal plane array randomly changing offset level, the method comprising:
   in an image processor:
      given a residual cube derived from a data cube of measurements generated by a focal plane array, in which each sample of the residual cube is a residual error value in approximating the data cube as a linear combination of basis vectors;
      determining a suspicious pixel suspected of causing an artifact in a measurement as a function of a statistical analysis of a collection of samples representing residual error values associated with a subject focal plane pixel measuring one waveband at different times;
      based on the determination of the suspicious pixel, identifying a pattern of residual error values indicative of the artifact caused by the suspicious pixel;
      determining a correcting time-dependent offset substantially reciprocal to the identified pattern of residual error values; and
      applying the correcting time-dependent offset to the measurement to correct for the artifact in the measurement.

2. The method of claim 1 wherein determining the suspicious pixel includes:
   calculating a statistical parameter value for samples of each focal plane pixel in the residual cube, including the subject focal plane pixel; and
   identifying the suspicious pixel based on a comparison of the calculated statistical parameter value of the subject focal plane pixel to an average of the calculated statistical parameter values for all focal plane pixels in the residual cube, including the subject focal plane pixel.

3. The method of claim 2 wherein the calculated statistical parameter value for samples of each focal plane pixel in the residual cube is an average, mean, median, standard deviations or combinations thereof.

4. The method of claim 1 wherein identifying the pattern includes:
   grouping some of the collection of samples into a first offset group and others into a second offset group; and
   identifying a transition from a first offset level and second offset level.

5. The method of claim 4 wherein identifying the transition includes:
   calculating a mean and standard deviation of samples of the first offset group, the first offset group having n number of samples;
   for each of m number of samples after the nth sample, determining a number of standard deviations from the calculated mean; and
   establishing the transition based on the determination.

6. The method of claim 5 wherein establishing the transition includes establishing the transition at the n+1th sample when the number of standard deviations for a sufficient number of m number of samples exceeds a threshold.

7. The method of claim 5 wherein establishing the transition includes:
   increasing the number of samples of the first offset group when the number of standard deviations for a sufficient number of the m samples does not exceed a threshold; and
   re-calculating a mean and standard deviation of the increased number of samples of the first offset group.

8. The method of claim 5 wherein m number of samples is user defined.

9. The method of claim 5 wherein m number of samples varies based on a characteristic of the focal plane array.

10. The method of claim 6 wherein m number of samples is 5 and the sufficient number of the m number of samples is 4.

11. The method of claim 4 wherein determining the correcting time-dependent offset includes calculating the first offset level as an average or mean of samples of the first offset group and calculating the second offset level as an average or mean of samples of the second offset group; and
   wherein applying the correcting time-dependent offset includes subtracting the first offset level from measurements associated with the residual error values of the first offset group and subtracting the second offset level from measurements associated with the residual error values of the second offset group.

12. An image processing system comprising:
   a memory storing computer executable instructions; and
   image processor coupled to the memory, the computer executable instructions when executed by the image processor cause the image processor to:
      determine a suspicious pixel suspected of causing an artifact in a measurement as a function of a statistical analysis of a collection of samples representing residual error values associated with a subject focal plane pixel measuring one waveband at different times, given a residual cube derived from a data cube of measurements generated by a focal plane array, in which each sample of the residual cube is a residual error value in approximating the data cube as a linear combination of basis vectors;
      based on the determination of the suspicious pixel, identify a pattern of residual error values indicative of the artifact caused by the suspicious pixel;
      determine a correcting time-dependent offset substantially reciprocal to the identified pattern of residual error values; and
      apply the correcting time-dependent offset to the measurement to correct for the artifact in the measurement.

13. A non-transitory computer readable storage medium storing computer readable instructions for processing images, which when executed by one or more processors cause the one or more processors to:
   determine a suspicious pixel suspected of causing an artifact in a measurement as a function of a statistical analysis of a collection of samples representing residual error values associated with a subject focal plane pixel measuring one waveband at different times, given a residual cube derived from a data cube of measurements generated by a focal plane array, in which each sample of the residual cube is a residual error value in approximating the data cube as a linear combination of basis vectors;

based on the determination of the suspicious pixel, identify a pattern of residual error values indicative of the artifact caused by the suspicious pixel;

determine a correcting time-dependent offset substantially reciprocal to the identified pattern of residual error values; and apply the correcting time-dependent offset to the measurement to correct for the artifact in the measurement.

* * * * *